US007601791B2

(12) United States Patent
Beutlhauser et al.

(10) Patent No.: US 7,601,791 B2
(45) Date of Patent: Oct. 13, 2009

(54) PROCESS FOR PROCESSING MIXTURES IN THE PRESENCE OF FLUORINATED VINYL POLYMER PACKINGS

(75) Inventors: Stephan Beutlhauser, Mehring (DE); Helmut Enthammer, Braunau (AT); Klaus Kaeppler, Burghausen (DE)

(73) Assignee: Wacker Chemie AG, Munich (DE)

( * ) Notice: Subject to any disclaimer, the term of this patent is extended or adjusted under 35 U.S.C. 154(b) by 322 days.

(21) Appl. No.: 11/481,113

(22) Filed: Jul. 5, 2006

(65) Prior Publication Data

US 2007/0015891 A1 Jan. 18, 2007

(30) Foreign Application Priority Data

Jul. 14, 2005 (DE) .................. 10 2005 032 947

(51) Int. Cl.
*C08G 77/06* (2006.01)
(52) U.S. Cl. .................. 528/12; 556/450; 556/452
(58) Field of Classification Search .................. 528/12; 556/450, 452
See application file for complete search history.

(56) References Cited

U.S. PATENT DOCUMENTS

| 3,478,886 | A | * | 11/1969 | Hornbeck ................. 210/198.2 |
| 3,493,595 | A | | 2/1970 | Strasser et al. |
| 3,577,266 | A | * | 5/1971 | Kirkland ..................... 428/404 |
| 4,032,557 | A | | 6/1977 | Spörk et al. |
| 4,448,981 | A | | 5/1984 | Tolentino |
| 4,576,763 | A | | 3/1986 | Nutter |
| 5,476,916 | A | | 12/1995 | Pachaly et al. |
| 5,766,565 | A | * | 6/1998 | Cronin et al. ............... 423/488 |
| 6,069,220 | A | | 5/2000 | Hoffmann et al. |

FOREIGN PATENT DOCUMENTS

| DE | 199 09 547 | 9/2000 |
| JP | 6157235 A | 3/1986 |
| JP | 07207028 A | 8/1995 |
| JP | 2002153748 A | 5/2002 |

OTHER PUBLICATIONS

English Patbase Abstract corresponding to DE 19909547.

* cited by examiner

*Primary Examiner*—Margaret G Moore
(74) *Attorney, Agent, or Firm*—Brooks Kushman P.C.

(57) ABSTRACT

The invention relates to a method for processing mixtures which contain HCl, $H_2O$ and siloxanes in the presence of packings comprising fluorinated vinyl polymers.

17 Claims, No Drawings

PROCESS FOR PROCESSING MIXTURES IN THE PRESENCE OF FLUORINATED VINYL POLYMER PACKINGS

BACKGROUND OF THE INVENTION

1. Field of the Invention

The invention relates to a process for processing mixtures which contain HCl, $H_2O$ and siloxanes, in the presence of packings comprising fluorinated vinyl polymers.

2. Background Art

The preparation of silicone oils or polyorganosiloxanes is effected by polymerization of cyclic or linear polydiorganosiloxane intermediates which are produced by hydrolysis and polycondensation of diorganodichlorosilanes. Hydrochloric acid is often used as a source of water which is required for the hydrolysis. The hydrogen chloride obtained in the hydrolysis is reacted with methanol to give chloromethane and is reused in the synthesis of dimethyldichlorosilane by the direct synthesis process. Mixtures which contain HCl, $H_2O$, and siloxanes are obtained thereby.

For example, U.S. Pat. Nos. 3,493,595 and 5,476,916 describe the preparation of $\alpha,\omega$-dihydroxypolydiorganosiloxanes from a crude-hydrolysis product which consists of cyclic and linear chlorine-containing polydiorganosiloxanes. For reducing the chlorine content and for removing cyclic substances, the crude hydrolysis product is treated with steam by a countercurrent method. The preparation of silicone oils or polyorganosiloxanes is expediently effected in a packed column, generally a column filled with ceramic packings. The ceramic consists of aluminosilicates with accompanying oxides of various metals such as Ti, Fe, K, Na, Ca and Mg. For example, saddle elements, Berl saddle elements, Pall rings, or special forms comprising ceramic may be used.

It has been found that the ceramic is chemically attacked under the prevailing process conditions. In particular, Al and Fe are dissolved out of the ceramic in the vicinity of the surface. This results in material defects and the formation of cavities, cracks and fissures in the aluminosilicate structure. The surface properties change; the mechanical stability of the packings decreases; and the packings easily break. A greater amount of abraded packing, which is difficult to separate, is discharged with the bottom product of the column. The separation efficiency of the column also decreases steadily. The packings have to be completely exchanged at intervals of 2 to 3 years, requiring downtime and expenses for purchase of new packings and disposal of the used packings.

The Al and Fe compounds formed, such as chlorides, oxychlorides and hydroxychlorides, remain in dissolved or suspended form in the $\alpha,\omega$-dihydroxypolydiorganosiloxane. These compounds act as condensation catalysts and cause undesired postcondensation of the $\alpha,\omega$-dihydroxypolydiorganosiloxanes. The viscosity increases in an unpredictable manner. Water which separates out makes the products cloudy and impairs their storage stability. The further processing to give a polymer is complicated by the varying quality, the varying water content and the Al and Fe compounds present.

SUMMARY OF THE INVENTION

It is an object of the invention to provide a process for processing mixtures which contain HCl, $H_2O$ and siloxanes, in which the packings are more stable. This and other objects are achieved through the use of packings comprising fluorinated vinyl polymers.

DETAILED DESCRIPTION OF THE PREFERRED EMBODIMENTS

The invention thus relates to a process for processing mixtures which contain HCl, $H_2O$ and siloxanes in the presence of packings comprising fluorinated vinyl polymers. The packings comprising fluorinated vinyl polymers are chemically, mechanically and thermally stable under the conditions which prevail during the processing of the mixtures which contain HCl, $H_2O$ and siloxanes.

The vinyl polymers may be partly or completely fluorinated. Preferred fluorinated vinyl polymers are those which are composed of structural units of the general formula 1

$$-(CR_2-CF_2)_n- \qquad (1),$$

in which R is hydrogen of fluorine. Preferably, n has values of at least 100, in particular at least 500. Polyvinylidine fluoride (PVDF) and polytetrafluoroethylene (PTFE) are particularly preferred.

The packings may have any desired shape. For example, rings, spirals, saddles, etc., which preferably have interrupted walls and/or cross-struts for increased surface area, are all suitable. Pall rings are preferred.

The processed mixtures may contain further aggressive constituents, such as alkanols, chlorosilanes and chlorohydrocarbons, in addition to HCl, $H_2O$ and siloxanes. Methanol and ethanol are frequently present as alkanols in the mixtures and chloromethane is frequently present as a chlorohydrocarbon in the mixtures. HCl and $H_2O$ may be present, for example, as dilute hydrochloric acid, as saturated hydrochloric acid or as HCl gas in the presence of small amounts of $H_2O$. Siloxanes may be present, for example, as linear or cyclic siloxanes which may carry reactive groups such as —OH and halogens. Preferably, the linear siloxanes are present as $\alpha,\omega$-dihydroxypolydiorganosiloxanes which partly also bear halogen atoms.

The pressures preferably used in the process are 0.1 to 100 bar, and the temperature is preferably maintained at 70 to 200° C., in particular at 80 to 150° C.

The processing of the mixtures which contain HCl, $H_2O$ and siloxanes preferably takes place in columns, and preferably also comprises purification steps such as deacidification, removal of halides from siloxanes, or distillation steps.

A preferred process comprises one or more steps of a process for the preparation of polydimethylsiloxanes, in which dimethyldichlorosilane is reacted with water present in hydrochloric acid to give a crude hydrolysis product consisting of cyclic and linear, chlorine-containing polydimethylsiloxanes and gaseous hydrogen-chloride.

Most preferably, the process according to the invention is used for the preparation of polydimethylsiloxanes, in which, in a first step, dimethyldichlorosilane is reacted with water present in hydrochloric acid to give a crude hydrolysis product consisting of cyclic and linear, chlorine-containing polydimethylsiloxanes and gaseous hydrogen chloride and, in a second step, the crude hydrolysis product is treated with steam with formation of hydrochloric acid to reduce the chlorine content, hydrochloric acid formed in the second step being used in the first step. This process is known per se from U.S. Pat. No. 5,476,916. In the second step, it is possible to use a column which is filled with packings comprising fluorinated vinyl polymers.

The inventive process is also, with particular preference, used in a process for the preparation of polydimethylsiloxanes, in which, in a first step, diorganodichlorosilane is reacted with water present in hydrochloric acid to give a crude hydrolysis product consisting of cyclic and linear, chlorine-containing polydiorganosiloxanes and gaseous hydrogen chloride; in a second step, the crude hydrolysis product is treated with steam with formation of hydrochloric acid to reduce the chlorine content, hydrochloric acid formed in the second step being used in the first step; in a third step, the crude hydrolysis product having a reduced chlorine content is treated with steam to further reduce the chlorine content, with formation of acid water containing hydrochloric acid and polydiorganosiloxanes, the acid water being separated into acid-free and acid-containing water, the acid-containing water being evaporated and the acid-containing steam obtained being used in the second step. This process is known per se from DE 19909547 A. In the second and third steps, it is possible to use columns which are filled with packings comprising fluorinated vinyl polymers.

Further preferred processes are processes for recovering alcohol from HCl-acidic water-alcohol mixtures which contain siloxanes. These are preferably distillation methods in which the packings comprising fluorinated vinyl polymers may be used. A process for recovering methanol from HCl-acidic water-alcohol mixtures which are obtained in the preparation of chloromethane from methanol and HCl is particularly preferred.

A process for recovering alcohol, in particular methanol and ethanol, from processes in which alkoxysilanes are hydrolyzed with hydrochloric acid is likewise particularly preferred. This method is known per se from U.S. Pat. No. 6,069,220 A.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a process for the preparation and processing of organopolysiloxanes wherein organochlorosilanes are hydrolyzed with water in the presence of hydrochloric acid to produce a crude hydrolysate comprising chlorine-containing polyorganosiloxanes and gaseous HCl or in a process for processing to recovering alcohol from acidic HCl, alcohol, and water mixtures containing siloxanes by distillation, the improvement comprising conducting one or more steps in the process in a column containing packings comprising fluorinated vinyl polymers at a temperature of 70° C. to 200° C.

2. The process of claim 1, wherein the packings consist of polyvinylidene fluoride or polytetrafluoroethylene.

3. The process of claim 1, wherein the packing consists of a polymer Of $$-(CR_2-CF_2)_n-$$

where n is at least 100 and R is H or F.

4. The process of claim 1, wherein the column is a distillation column.

5. The process of claim 1, wherein the column contains packings arrayed to allow the introduction of countercurrent steam.

6. The process of claim 1, in which the fluorinated vinyl polymers comprise structural units of the formula 1

$$-(CR_2-CF_2)_n- \qquad (1),$$

in which R is hydrogen or fluorine and n has a value of at least 100.

7. The process of claim 6, wherein the packings are in the form of Berl saddles, Pall rings, or a combination thereof.

8. The process of claim 6, wherein processing comprises at least one purification step selected from the group consisting of deacidification, removal of halides from siloxanes, and distillation.

9. The process of claim 1, wherein at least one vinyl polymer is polyvinylidine fluoride (PVDF) or polytetrafluoroethylene (PTFE).

10. The process of claim 9, wherein processing includes treating a crude hydrolysate from a diorganodichlorosilane with steam and recovering an organosiloxane having less bound chlorine.

11. The process of claim 9, wherein processing comprises at least one purification step selected from the group consisting of deacidification, removal of halides from siloxanes, and distillation.

12. The process of claim 1, wherein processing takes place at from 80° C. to 150° C.

13. The process of claim 12, wherein processing comprises at least one purification step selected from the group consisting of deacidification, removal of halides from siloxanes, and distillation.

14. The process of claim 1, wherein processing comprises at least one purification step selected from the group consisting of deacidification, removal of halides from siloxanes, and distillation.

15. In a process for processing mixtures which contain HCl, $H_2O$ and siloxanes wherein packings are employed, the improvement comprising employing packings comprising fluorinated vinyl polymers wherein the packings are contained in a column, and are in one or more of the forms of Ben saddles, Pall rings, or spirals.

16. The process of claim 15, wherein chlorine-containing organosiloxanes are reacted with countercurrent steam to lower the chlorine content of the organopolysiloxanes.

17. A process for reducing the chlorine content of a crude hydrolysis product of a hydrolyzable composition comprising diorganodichiorosilanes, comprising treating the crude hydrolysis product with steam in a packed column, wherein packings in the packed volume comprise fluorinated vinyl polymers, and recovering an organosiloxane hydrolysis product having a lower chlorine content.

* * * * *

UNITED STATES PATENT AND TRADEMARK OFFICE
CERTIFICATE OF CORRECTION

PATENT NO. : 7,601,791 B2  
APPLICATION NO. : 11/481113  
DATED : October 13, 2009  
INVENTOR(S) : Beutlhauser et al.

Page 1 of 1

It is certified that error appears in the above-identified patent and that said Letters Patent is hereby corrected as shown below:

Column 3, Line 40, Claim 1:

Delete "organochiorosilanes"
and insert -- organochlorosilanes --.

Column 4, Line 43, Claim 15:

Delete "Ben saddles"
and insert -- Berl saddles --.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,601,791 B2  Page 1 of 1
APPLICATION NO. : 11/481113
DATED : October 13, 2009
INVENTOR(S) : Beutlhauser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 422 days.

Signed and Sealed this

Fifth Day of October, 2010

David J. Kappos
*Director of the United States Patent and Trademark Office*